April 23, 1940.  R. E. TOZIER  2,197,818
FLOWMETER
Filed Dec. 27, 1938  2 Sheets-Sheet 1

INVENTOR.
Robert E. Tozier
BY
Ransom K. Davis
ATTORNEY.

April 23, 1940.                    R. E. TOZIER                    2,197,818
FLOWMETER
Filed Dec. 27, 1938                                    2 Sheets-Sheet 2

INVENTOR.
Robert E. Tozier
BY
Ransom K. Davis
ATTORNEY.

Patented Apr. 23, 1940

2,197,818

UNITED STATES PATENT OFFICE 2,197,818

FLOWMETER

Robert E. Tozier, Hampton, Va.

Application December 27, 1938, Serial No. 247,940

1 Claim. (Cl. 73—204)

(Granted under the act of March 3, 1883, as amended April 30, 1928; 370 O. G. 757)

This invention relates to a flowmeter of the electrical type, especially intended for measuring mass rates of flow of gasoline or other non-conducting fluid.

A further object of this invention is to provide an improved flowmeter of the type generally shown in U. S. patents to Thomas, Nos. 1,254,374; 1,222,492; 1,218,717; 1,193,488; 1,043,983; 946,886; and Packard, Nos. 1,321,546; 1,325,040; 1,487,356; 1,525,463; 1,282,926.

An improved feature of this invention over the prior art such as that above referred to, is the particular construction hereof facilitating the use thereof on aerial vehicles.

A further object of this invention is to provide a flowmeter utilizing a particular construction of very sensitive thermocouple enabling more accurate measurements to be made with a much smaller temperature differential than is possible with measuring means of the prior art.

Still a further object of this invention is to provide a multiple thermocouple that is particularly sensitive and accurate for use in the flow meter of this invention.

Still a further object of this invention is to provide an accurate portable fluid flowmeter for use in flight in aerial vehicles which will be unaffected at temperature extremes, moderate accelerations, or changes in fluid characteristics, and may be made remote-indicating.

With the foregoing and other objects in view, the invention consists in the construction, combination and arrangement of parts hereinafter described and illustrated in the drawings, in which.

Figure 1:
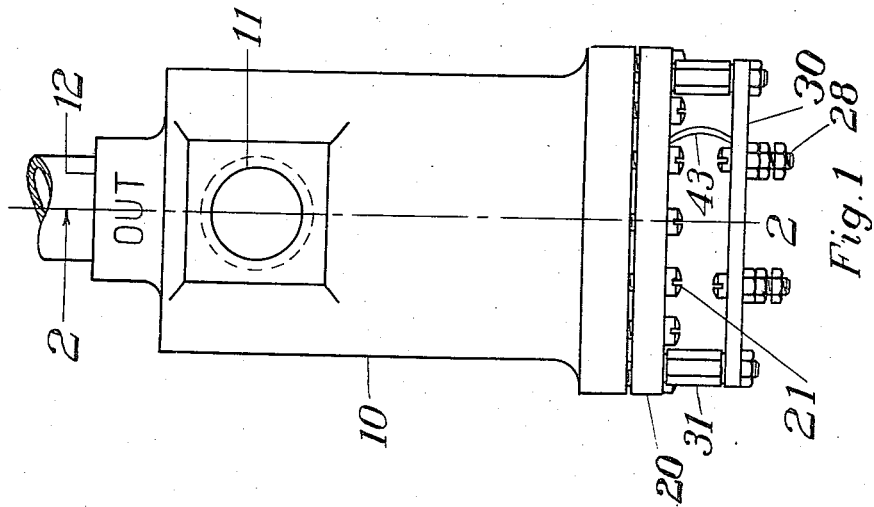
Fig. 1 is a front view in elevation of the flowmeter housing.
Figure 2:
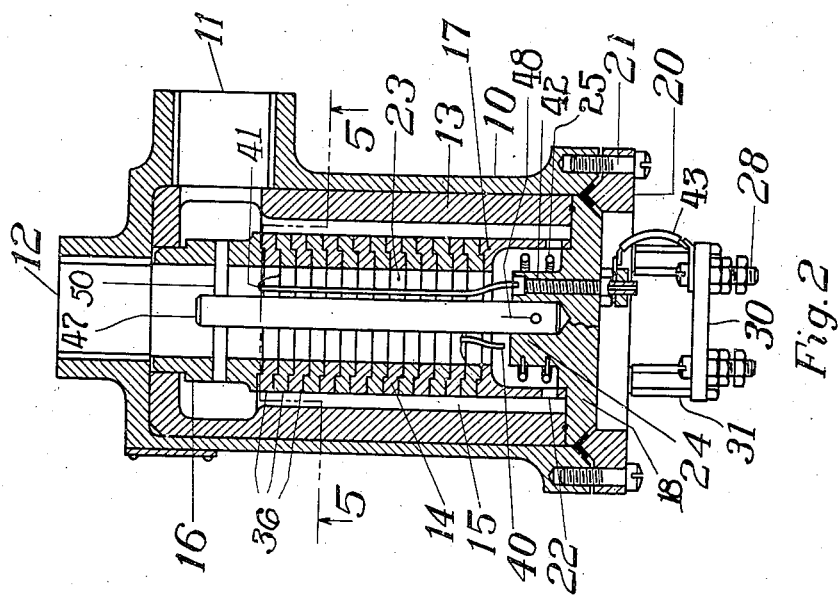
Fig. 2 is a sectional view on line 2—2 of Fig. 1.
Figure 3:
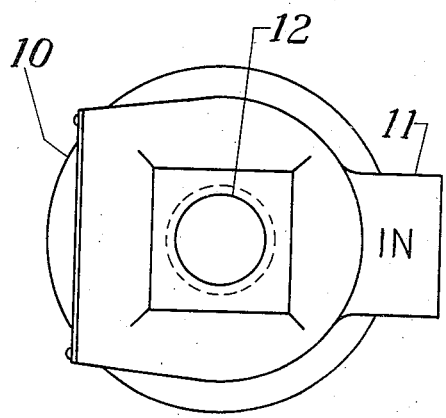
Fig. 3 is a plan view of Fig. 2.
Figure 4:
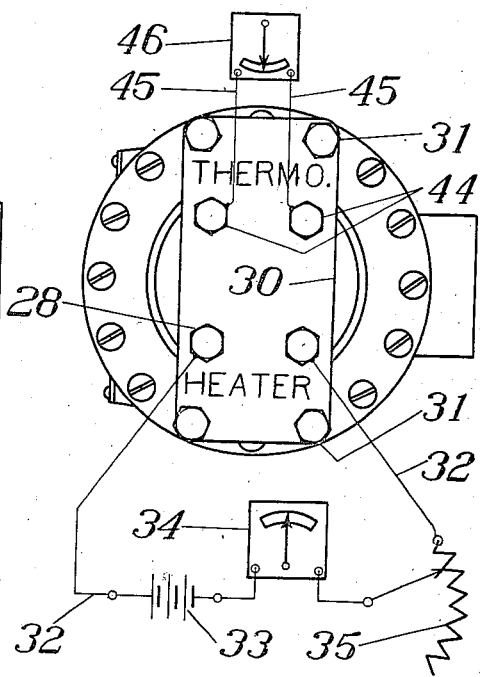
Fig. 4 is a bottom plan view of Fig. 2, with the indicator diagrammatically illustrated.
Figure 5:
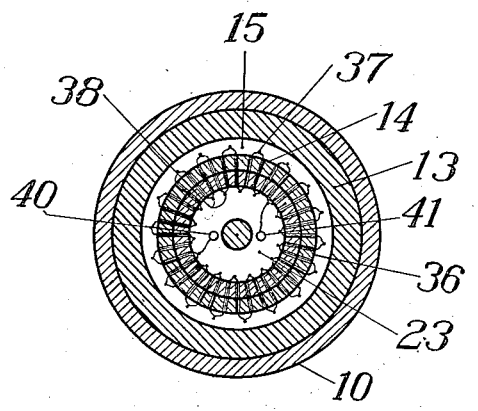
Fig. 5 is a sectional view on line 5—5 of Fig. 2.
Figure 6:
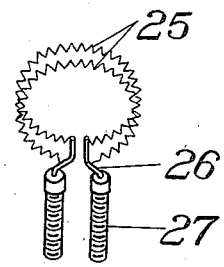
Fig. 6 is a perspective of the heating elements.

There is shown at 10 the flowmeter housing provided with a fuel inlet 11 and a fuel outlet 12. Within the housing 10 is a liner 13 within which is centrally located a thermocouple assembly 14 spaced from the liner 13 by a passageway 15 connected to the fuel inlet 11. The thermocouple assembly 14 is in the form of a cylinder held between a bushing 16 against the inside of the top of the housing 10 and a base 17 mounted on the heating unit core 18 which, in turn, is secured to the housing 10 by a packing clamp ring 20 and stud screws 21. The base 17 is provided with a plurality of apertures 22 connecting the outer passageway 15 to the inner passageway 23 within the thermocouple 14, the inner passageway 23 connecting to the fuel outlet 12. The heating unit core 18 serves to seal off the bottom of the passageways 15 and 23 which thereby are connected together by the apertures 22 in the base 17.

The heating unit core 18 is provided with a boss 24 about which is supported a pair of resistor wire heater elements 25 connected to pins 26 and mounted on bolt terminals 28 which extend through the boss 24 of the heating unit core 18. To insure a liquid-tight seal the threads 27 of the bolt terminals 28 are shellacked before assembly. The outer ends of the bolt terminals 28 are then provided with conductor mediums connecting them to the inner sides of terminals 28 mounted in a bridge 30, the bridge 30 being secured to the housing 10 by extended bolts 31. From the terminals 28 there extend suitable conductors 32 to a source of electrical energy 33, an ammeter or similar instrument 34, and a regulating rheostat 35 for providing a measured amount of electrical potential to the heater elements 25. By appropriate manipulation of the rheostat 35 a predetermined amount of heating units will be generated by the heater elements 25 and be given off to the fuel entering the inlet 11 flowing through the passageway 15, the base apertures 22 to the inner passageway 23 and through the outlet 12.

The thermocouple assembly 14 consists of a cylindrical member made up of a plurality of thermocouple holders 36, each of which is in the form of a stepped washer, so that one may be fitted tightly upon the other, holding the assembly in cylindrical form. Each holder, except the bottom one, is slotted radially at its top and bottom, the bottom one being slotted only at the top, there being preferably thirty-six radial slots equally spaced about each holder so that as the holders are assembled they provide grooves through which extend the thermocouple wires laid therein before assembly.

The thermocouple wires consist of alternate "Cromel" (chromium and nickel) and "Alumel" (aluminum and nickel) wires welded together so that their outer junctions 37 extend into the outer passageway 15 and the inner junctions 38 extend into inner passageway 23. When being assembled the slots are each filled with shellac about the wires to seal the inner passageway from the outer passageway. In each layer one wire of "Cromel" is joined to a wire of "Alumel" of a lower layer, while its adjacent "Alumel" wire is joined to a "Cromel" wire of the next upper layer, thereby joining all the thermocouples in series. In the form shown there are substantially fourteen layers of thirty-six junctions to each layer, providing a thermocouple assembly of extreme sensitivity. Finally, one wire of one end of the materials, as the lower end for instance, is joined to a copper wire 40 which is secured to a bolt extending through the heater core boss 24, while another wire of the other material at the other end is joined to a copper wire 41 extending upwardly through the inner passageway 23, bolt terminals 42 likewise extending through the heater core boss 24, the bolt terminals being connected on their outside by connectors 43 to terminals 44 through the bridge 30. The terminals 44 are connected by conduits 45 to a suitable indicator 46 which may be in the form of a millivoltmeter or microammeter.

The meter thus described is similar in principle to the meters disclosed in the Thomas and Packard patents above referred to and flowmeters that measure a temperature difference created in the fluid by the addition of electrically generated heat. The heat input is fixed by the rheostat 35 and current indicator 34, and the temperature difference developed is read as a measure of the rate of flow at the indicator 46.

In assembling the thermocouple assembly 14 the core boss 24 is provided with a rod 47 pinned thereto as at 48 and adapted to extend through the center of the passageway 23 and have a pin 50 driven through its end and the sides of the bushing 16 after the thermocouple wires and holders have been properly assembled. All of the wires and all of the terminals that extend through apertures or slots are each sealed with shellac to prevent any leakage of fuel from the inner passageway to the outer passageway or to the outside of the flowmeter, so that the fuel can only follow the proper passageway from the inlet to the outlet, through the inner passageway, the apertures in the mechanism, about the heater elements, and out through the inner passageway to the outlet, bathing the thermocouple junctions in the outer and inner passageways as it passes therethrough.

In practice, current that passes through the resistance type heater elements 25 is regulated at a fixed value. The values of the heater resistance and of the current fix the temperature change developed in the stream of fuel passing through the passageways 15 and 23 according to the relation $$\Delta T = \frac{kI^2 R_0 (1+\beta t)}{\text{lb./hr.} \times (\text{sp. heat})_0 (1+\alpha t)} \quad (1)$$

where $\Delta T$ is the developed temperature difference.
$k$, a constant.
$I$, heater current.
$R_0$, resistance of heater wire at temperature $T_0$.
$\beta$, the temperature coefficient of resistance of heater wire.
$t = (T - T_0)$, temperature variation from reference temperature.
$T_0$, the reference temperature corresponding to $R_0$ and (sp. heat)$_0$.
lb./hr., pounds per hour flowing.
$\alpha$, the temperature coefficient of specific heat of fuel.

The value of $\beta$ should be chosen equal to $\alpha$ to eliminate the temperature dependence. This practice may be varied, however, to give other results as desired; e. g., volume rate of flow indication may be found by including the expansion coefficient of the fluid and by choosing a suitable value of $\beta$. The instrument described is made to indicate mass rate of flow.

By proper calibration the indicator 46 may read directly in terms of pounds per hour or gallons per hour, as desired, thus enabling the operator or the pilot of an aircraft to know instantly at what rate the aircraft is consuming fuel.

Other modifications and changes in the proportions and arrangements of the parts may be made by those skilled in the art without departing from the nature of the invention, within the scope of what is hereinafter claimed.

The invention described herein may be manufactured and/or used by or for the Government of the United States for governmental purposes without the payment of any royalties thereon or therefor.

Having thus set forth and disclosed the nature of this invention, what is claimed is:

In a flowmeter for measuring the passage of fuel therethrough, having a housing, a fuel inlet and a fuel outlet in the housing, a heater means mounted between the inlet and the outlet; a multi-junction thermocouple comprising a plurality of thermocouples joined in series, one set of thermocouple junctions being exposed to the incoming fuel before it reaches the heater means and the other set of thermocouple junctions being exposed to the outgoing fuel after it passes the heater means, a cylindrical assembly consisting of a plurality of stepped washers dished together and a plurality of pairs of thermocouple wires extending radially of said cylindrical assembly in slots formed between said stepped washers, said pairs of thermocouple wires being joined internally and externally of said cylindrical assembly in series to provide a multiplicity of thermocouple junctions.

ROBERT E. TOZIER.